Aug. 5, 1941.　　　　L. L. SCHAUER　　　　2,251,761
SPACING MECHANISM FOR MACHINE TOOLS
Filed Oct. 17, 1939　　　　2 Sheets-Sheet 1
FIG. 1
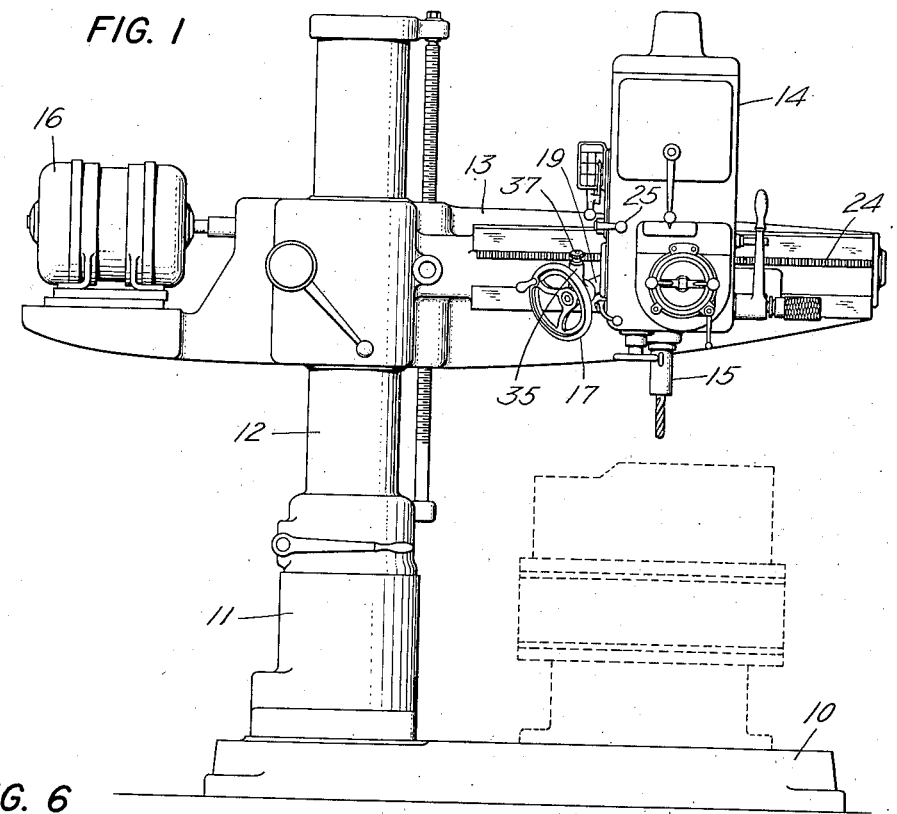
FIG. 6
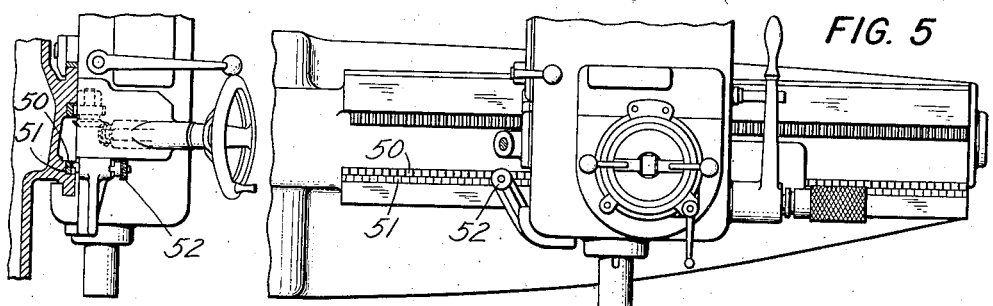
FIG. 5
FIG. 8
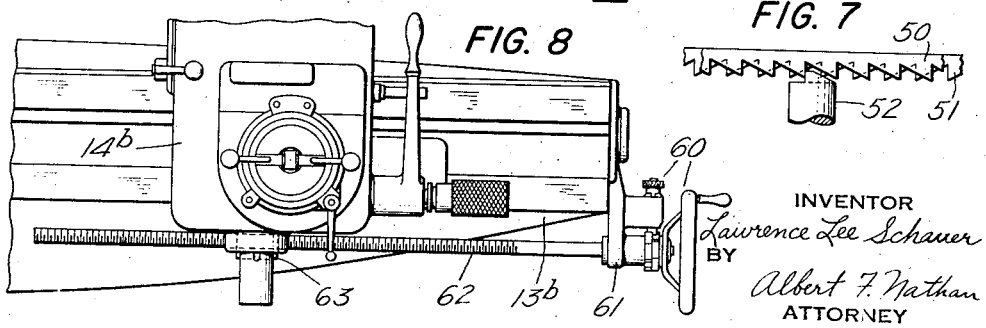
FIG. 7
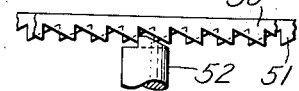
INVENTOR
Lawrence Lee Schauer
BY
Albert F. Nathan
ATTORNEY

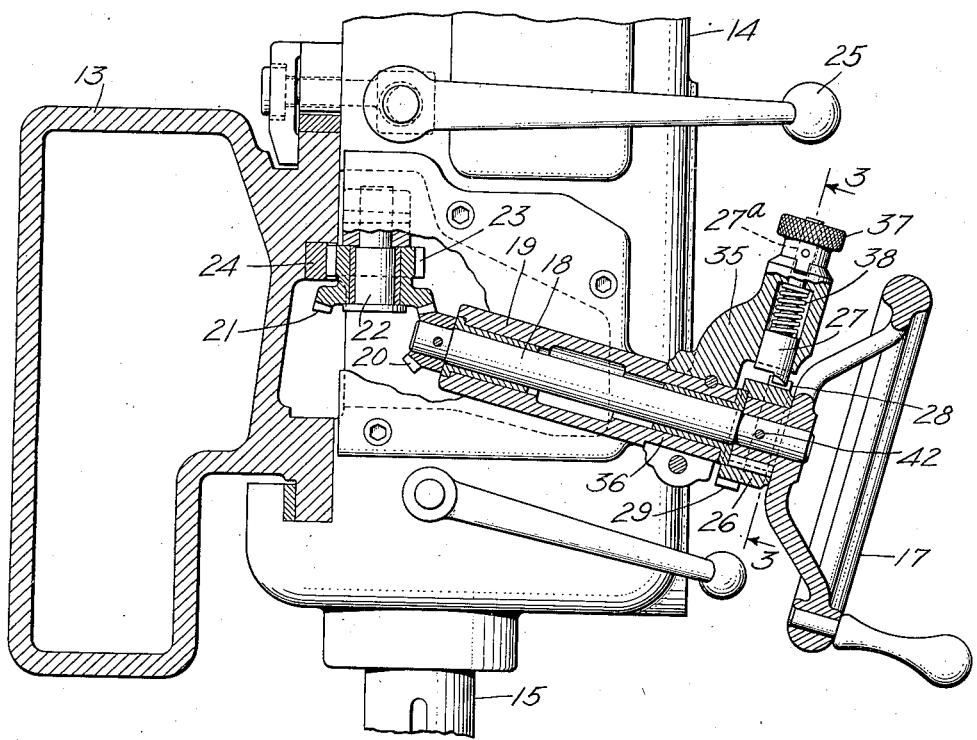
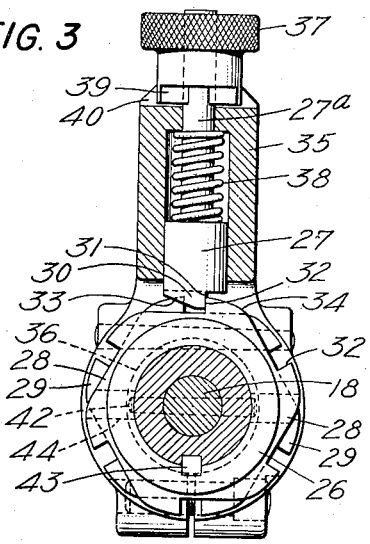
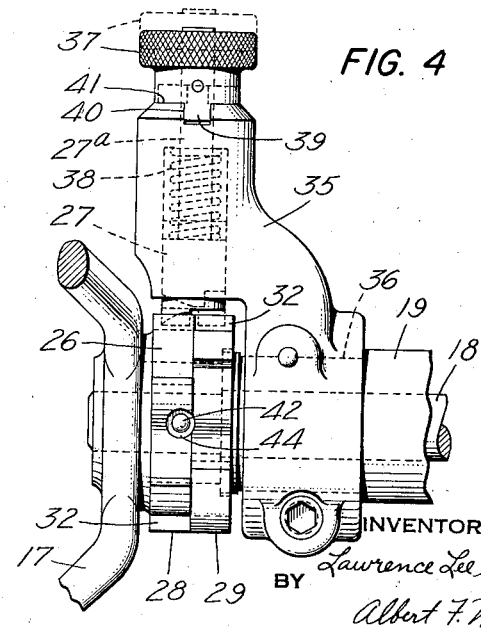

Patented Aug. 5, 1941

2,251,761

UNITED STATES PATENT OFFICE 2,251,761

SPACING MECHANISM FOR MACHINE TOOLS

Lawrence Lee Schauer, Wyoming, Ohio, assignor to The Cincinnati Bickford Tool Company, Oakley, Cincinnati, Ohio, a corporation of Ohio Application October 17, 1939, Serial No. 299,839

9 Claims. (Cl. 77—64)

The present invention relates to drilling and like machines and is concerned more particularly with an improved means for expeditiously locating the tool a succession of times relative to the work to be operated upon. A primary purpose of the invention is to reduce the time required in drilling a row of spaced holes in a workpiece, the spacing of which may be uniform or non-uniform as may be required.

A further aim of the invention is to enable the operator to attain, in a precision-like manner, a prearranged spacing of a succession of holes in a workpiece without recourse to complicated drill plates and fixtures and their attendant disadvantages.

Still a further aim of the invention is to render available a spacing device that may conveniently be applied to existing machine tools and be available for use whenever the requirements of the operation demand a precision repositioning of the tool one or more times in accordance with a preselected layout of the work.

Another object of the invention is to provide a spacing attachment that is electively operative in either direction of shift of the tool relative to the work so that the operator may, for example, progressively advance the tool in one direction and perform a series of precision spaced operations, and then back step the same or a different tool with a like degree of precision spacing. By making each translation or shift of the tool relative to the workpiece a productive translation, idle time-taking movements are eliminated and the floor to floor time for tooling is measurably decreased.

The invention further aims to render available a structure that is simple and uncomplicated in nature, and a structure that is capable of efficient operation, and which lends itself readily adaptable to change to meet any one of a wide variety of spacing requirements of the particular work at hand.

The present invention is particularly useful in connection with drilling machines of the radial type for in such machines the tool head is laterally adjustable along the radial arm and is frequently used for drilling a plurality of spaced holes in a given workpiece. Unless a drilling jig is used whenever a series of holes is to be drilled in line, e. g., rivet holes in boiler plate, considerable time is involved in inching the tool head back and forth on the arm in order properly to locate the tool over the spot to be operated upon. When a succession of holes is to be drilled, the idle time consumed in locating the drill point often proved to be the major portion of the total time taken for the entire project. With the aid of the present invention that same machine may now be inexpensively equipped with a spacing device by the aid of which the operator may expeditiously advance the tool head in a step-by-step manner with the assurance that a predetermined and accurate spacing of holes according to a prearranged scheme or pattern will be attained.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views of which—

Figure 1 represents a radial drill embodying the present invention.

Fig. 2 is a cross section through portions of the arm and drill head illustrating more clearly a preferred form of drill spacing device.

Figs. 3 and 4 are enlarged views of the spacing mechanism illustrated in connection with Fig. 2.

Figs. 5, 6 and 7 are fragmentary views of a variant form of spacing attachment.

Fig. 8 is still another variant form of spacing attachment.

With reference more particularly to Figs. 1 to 4, the radial drill illustrated comprises a base member 10 having at one end thereof an upstanding column 11 and rotatable sleeve 12 upon which is mounted for vertical movement, a laterally extending radial arm 13. A tool head 14 is translatably mounted upon the arm and supports a rotatable and translatable tool spindle 15. A motor 16 furnishes the power for rotating and feeding the spindle in a conventional manner as will be understood.

Translation of the tool head along the arm 13 is effected in this instance by means of a hand wheel 17 mounted upon a shaft 18 journaled in a bearing bracket 19 secured to the side of the drill head. The inner end of the shaft 18 carries a bevel pinion 20 which meshes with a bevel gear 21 journaled in a stub shaft 22 carried by the drill head. The gear 21 has secured thereto a pinion gear 23 that meshes continuously with the teeth of a rack 24 imbedded in a channel formed lengthwise of the arm. The rack bar 24 extends along the arm substantially its full length and by manipulating the hand wheel 17 the tool head may be traversed therealong to position the drill spindle at any given position radially of the column of the machine. When the proper lateral position of the tool has been attained the drill head may be clamped firmly to the arm by operating the clamp lever 25.

Ordinarily the task of locating the drill point directly over the spot to be drilled is not easy of accomplishment with any degree of speed or rapidity for the reason that it is difficult to overcome the inertia of the mass of the tool head 14 instantly at the desired point. Usually the head is inadvertently propelled beyond the mark and must be retracted, and after several attempts the point of the tool is finally brought to the required position.

If but one hole is to be drilled, the set-up time in locating the drill point is, in many instances, far in excess of the time consumed by the actual drilling operation, and if two holes are to be drilled the idle time in locating the drill point is doubled. Where a whole row of holes are to be drilled the idle time in inching the tool head back and forth over the workpiece manifestly becomes a major factor in the cost of the entire drilling operation.

The present invention undertakes to provide a device that may be inexpensively constructed and attached to an organization of this character and by means of which the drill may be repositioned quickly and repeatedly and brought to a definite stop with a high degree of precision in every adjusted position. A preferred form of device for this purpose is illustrated in Figs. 2 to 4 and includes the provision of a two-way acting ratchet wheel 26 and a selective latch pin 27. As illustrated in Figs. 2 and 3, the ratchet wheel 26 has formed about its periphery two rows of teeth 28 and 29, the teeth of each row lying in a single plane, and all of the teeth of one row oppositely facing the teeth of the other row.

The latch pin 27 extends radially of the wheel 26 and lies substantially in the general plane of both of the rows of ratchet teeth. The lower end of the latch pin is cut away at one side to provide an extending abutment portion 30 that will lie wholly in the plane of one of the rows of teeth 28, 29. The front wall 31 of the abutment thereby provided is adapted to be engaged by the substantially radial wall 32 of each ratchet tooth, and the rear wall 33 of the plunger is inclined to provide a cam surface. Likewise the heel portion 34 of each tooth of the ratchet wheel is relieved inwardly and cooperates with the inclined surface 33 in causing the plunger 27 to recede on rotation of the ratchet wheel in a clockwise direction as viewed in Fig. 3.

The plunger 27 is rotatably and translatably journaled in a bracket 35 which preferably is both keyed and clamped to a hub portion 36 of the bearing bracket 19. The plunger 27 is provided with a reduced stem 27ᵃ that projects through the bracket 35 and carries at its outer end a hand grasp 37. Within the bracket 35 is a helical spring element 38 which surrounds the shaft 27ᵃ and continuously exerts a force in a direction tending to engage the abutment portion 33 thereof with the teeth of the ratchet wheel.

As it may not always be necessary or practical to allow the plunger to project continuously into the path of the teeth of the ratchet wheel, means have been provided for withdrawing the plunger and locking it in an ineffective position. A convenient lock-out may be formed by milling or otherwise providing a diametrical tongue 39 on the lower end of the hand grasp 37 and complemental slot 40 in the bracket 35. When it is desired to withdraw the plunger from action, the hand grasp 37 is lifted and then slightly turned so as to cause the lower surface of the tongue 39 to bear against the top surface 41 of the bearing bracket 35 and the plunger 27 is thereby held definitely out of action. Conversely, a slight turn of the hand grasp to align the tongue 39 with the slot 40, permits the spring 38 to extend the plunger into the path of movement of the teeth of the ratchet wheel and the spacing attachment becomes effective.

In the specific embodiment shown in Fig. 3, each row of teeth of the ratchet wheel is provided with six equally spaced abutment surfaces 32; hence the lineal distance traversed by the tool head in one complete turn of the hand wheel is divided into six equal portions. It is contemplated, however, that a ratchet wheel will be used that is provided with the requisite number of teeth of equal or unequal spacing as may be required to effect a particular spacing of the holes in the workpiece to be operated upon and accordingly, the hand wheel 17 is made conveniently removable so that any one of a number of different ratchet wheels may be mounted thereon to effect a preselected spacing or arrangement of holes in the workpiece.

To that end the hub of the hand wheel 17 is keyed by a pin 42 directly to the shaft 18, whereas, the ratchet wheel 26, is keyed as at 43 to the hub of the hand wheel 17. Access to the pin 42 to permit insertion and withdrawal thereof is made possible through an oversized transverse hole 44 formed in the ratchet wheel.

The device operates as follows: A turning of the hand wheel 17 in a clockwise direction (with the parts arranged as illustrated in Fig. 3) causes a movement of the drill head and tool spindle to the right in Fig. 1. Clockwise turning of the wheel also causes the cam surfaces 33 and 34 to engage and depress the plunger 27. When the tooth of the ratchet wheel overrides the end of the plunger, the latter snaps into position and a slight counter movement of the hand wheel reverses the direction of head movement until the abutments 31, 32 engage and act as a positive stop. With the work blank originally clamped in a position in coincidence with the position of positive stop of the tool spindle, the drilling operation at that point may then be performed. Thereafter, succeeding drilling operations are quickly performed by advancing the tool head in a step-by-step manner and at each step applying a counter acting pressure on the wheel to insure that the abutments 31, 32 are definitely engaged. Such positive engagement definitely locates the drill point at the required position and repeated jogging of the head along the arm has been eliminated.

In certain classes of work it may be necessary or advisable progressively to advance the tool spindle from right to left, instead of from left to right as just explained, as for instance, when drilling two or more long rows of holes. The present invention is constituted to attain that objective and which is accomplished by withdrawing the latch pin 27 to a position whereat the tongue 39 clears the slot 40 and then turning the latch pin about its axis through a distance of 180°. This rotation of the latch pin places the offset projecting portion 30 and its abutment face 31 in the plane of the teeth in the ratchet 29 and the locking tongue 39 again in alignment with the slot 40. With the offset portion of the plunger so rearranged, the tool spindle may be traversed to the left step-by-step and at each step brought to a positive stop in the same manner as herein before explained.

Using a two-way operating ratchet wheel in which each set of teeth thereon are, in effect, directly opposite, it is possible to shift the tool spindle step-by-step in one direction and to thereafter back step the spindle in the other direction to identically the same positions. Thus, it is possible to drill a succession of holes while traversing the spindle one way and to perform a second operation such as counter-boring, facing, etc., on the same holes by progressively stepping the tool spindle in the reverse direction. In the case of drilling two or more rows of holes, the workpiece may be shifted at the completion of the last hole in each row and the tool spindle back stepped along the new line to be drilled.

The removal and replacement of ratchets having different tooth spacings is effected by removing the locking pin 42 and withdrawing the hand wheel from the shaft 18. When this has been done the ratchet wheel 26 may be slipped off the hub of the hand wheel and replaced by another having the desired tooth spacing for a given character of work. The hand wheel with its substituted ratchet is then reassembled on the shaft 18 and the spacing attachment is again ready for operation in either or both directions as heretofore explained.

In the variant form of spacing attachment illustrated in Figs. 5, 6 and 7, a pair of toothed bars 50, 51 are imbedded in the arm of the machine and extend lengthwise thereof, and the latch plunger 52 is carried directly by the drill head. In this form of spacing attachment the plunger 52 directly locates the drill head and hence the spindle instead of operating through the head traversing mechanism. The plunger in this form normally is spring pressed into engagement with one of the rows of teeth 50, 51, and like the previous form may be withdrawn and locked out of effective action or turned 180° so that the tool spindle may be traversed freely or in a step-by-step manner selectively in opposite directions.

In the arrangement disclosed in Fig. 8, the hand wheel and ratchet mechanism 60 is supported directly upon the drill arm 13ᵇ by a bracket 61, and operates a screw shaft 62. The screw shaft extends lengthwise the arm and operates through a nut 63 secured directly to the drill head 14ᵇ. In this modification still finer increments of adjustment may be obtained. A complete turn of the hand wheel will feed the head a distance equal to the pitch of the thread of the screw shaft 62, whereas, fractional turns of the hand wheel, as controlled by the latch mechanism associated therewith, correspondingly effect movement of the drill head fractional distances.

In all forms of spacing attachments disclosed, the precision locating element, whether it takes the form of a toothed bar as illustrated by Fig. 5, or the form of a wheel (Figs. 3 and 8) is constructed and arranged for convenient removal and replacement by another having a spacing contour in conformity with the particular scheme of spacing required for the operations to be performed upon the workpiece. And in all forms the spacing attachment is selectively operable in either direction of shift of the tool spindle and may be rendered effective or completely ineffective at will.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A spacing device for a machine tool having an arm member and a tool carrying member adjustable therealong comprising a toothed element rotatably supported by one of said members, said toothed element having two sets of teeth thereon lying in different planes and with the teeth of one set oppositely facing the teeth of the other set; an axially movable latch plunger having a projecting abutment portion offset from its axis and positioned normally in cooperative relation with the teeth of one of said two sets of teeth of the said toothed element; a relatively stationary bracket secured to one of said members for supporting said plunger in said cooperative relation; means for rotating said axially movable plunger about its own axis to bring the abutment portion thereof into the plane of either of said sets of teeth electively; and means for removing and locking said abutment portion out of cooperative relation with the teeth of both of said two sets.

2. A spacing device comprising a ratchet element adapted to be supported by one of two relatively movable members, said element having a set of teeth thereon effective in one direction of relative movement and another set of teeth thereon effective in the opposite direction of relative movement; a spring pressed latch plunger common to both of said sets of teeth; a bracket member for supporting said spring pressed plunger in space in cooperative relation with said ratchet element; said plunger having an abutment portion adapted normally to coact with only one of said sets of teeth; and means operable at will to effect coaction between said abutment and either one of said sets of teeth selectively to effect a station to station positioning of one of said movable members relative to the other in a given direction of relative movement between said members.

3. A spacing attachment for a radial drill having an arm member and a tool head member laterally adjustable therealong comprising a toothed element supported by one of said members, a rotatable and axially movable plunger having an abutment portion offset from its axis arranged normally in cooperative relation with the teeth of said toothed element; a bracket secured to one of said members for journaling said plunger in said cooperative relation; means for rotating the plunger about its own axis to position the said abutment portion thereof laterally to one side of the teeth of said toothed element, and means provided in part by said bracket and in part by said plunger for locking the plunger in either of said two positions.

4. A drill spacing attachment for a radial drill having an arm member and a tool carrying head member laterally adjustable therealong comprising a ratchet element having two sets of ratchet teeth thereon lying in different planes supported by one of said members; a rotatable and axially movable latch plunger having an axially extending abutment portion offset from its axis of rotation and arranged normally in cooperative relation with one of the sets of ratchet teeth on said element; a relatively stationary bracket secured to one of said members for supporting said latch plunger in said cooperative relation; means for locking the plunger against rotation with the abutment portion thereof positioned selectively in the plane of one of the said two sets of teeth; and means for rotating said element thereby to effect adjustment of said head along the arm in the direction and through distances determined by the spacing of the ratchet teeth of the particular set on said ratchet element effective at the time.

5. A step-by-step spacing device for a machine having an arm member and a tool carrying member adjustable therealong comprising a rotatable element removably journaled to said tool carrying member, power transmitting connections between said element and said arm member, said rotatable element having two sets of teeth thereon lying in different planes and with the teeth of one set oppositely facing the teeth of the other set; a spring pressed latch plunger having an abutment portion thereon offset from its axis and positioned normally in cooperative relation with the teeth of one of said two sets of teeth of the said rotatable element; a bracket secured to the tool carrying member for supporting said plunger in said cooperative relation; means for positioning said plunger in said bracket to bring the abutment portio nthereof into the plane of either of said sets of teeth electively; and means to rotate said rotatable element thereby to adjust said tool carrying member along said arm in synchronism, said plunger and rotatable element coacting definitely to locate the positioning of the tool carrying member along the arm in accordance with the spacing of the teeth on the rotatable element.

6. A spacing device for a machine tool having a supporting member and a tool carrying member adjustable thereon comprising a toothed element removably supported by one of said members, said toothed element having two sets of teeth thereon lying in different planes and with the teeth of one set oppositely facing the teeth of the other set; a spring pressed latch plunger having a projecting abutment portion laterally offset from its axis and positioned normally in cooperative relation with the teeth of one of said sets of teeth of the said toothed element; a bracket secured to the tool carrying member for supporting said plunger in said cooperative relation; means for positioning said plunger in its supporting bracket to bring the abutment portion thereof into the plane of either of said two sets of teeth electively; and means for adjusting said tool carrying member along said supporting member in a direction in which the teeth of the row of teeth selected are facing said toothed element and plunger coacting definitely to locate the positioning of the tool carrying member relative to its support in accordance with the spacing of the operating set of teeth on said toothed member.

7. A spacing device comprising a ratchet wheel element adapted to be supported by one of two relatively movable members, power transmitting connections between said wheel element and the other of said movable members, said element having a set of teeth thereon effective in one direction of relative movement and another set of teeth thereon effective in the opposite direction of relative movement; a spring pressed latch plunger common to both of said sets of teeth; a bracket member for supporting said spring pressed plunger in cooperative relation with said ratchet wheel element, said plunger having an abutment portion adapted normally to coact with only one of said sets of teeth; means for rotating said wheel element thereby to effect a shifting of one of the said movable members relative to the other in synchronism; and means operable at will to effect coaction between said abutment and either of said sets of teeth selectively to control direction of movement and to effect a station to station positioning of the movable member relative to the other as determined by the spacing of the operating set of teeth on said element.

8. A spacing attachment for a radial drill having an arm member and a tool carrying head member laterally adjustable therealong comprising a ratchet wheel element supported by said arm member; a spring pressed latch plunger having an abutment portion offset from its axis of rotation arranged normally in cooperative relation with the teeth on said element; a bracket secured to said arm member for supporting said latch plunger in said cooperative relation; a screw shaft journaled in said arm bracket and having a threaded engagement with a nut carried by said head; means for rotating said ratchet wheel and said screw shaft in synchronism unit distances as determined by the spacing of the teeth on said ratchet wheel; and means operable at will to render said plunger and ratchet wheel mechanism ineffective.

9. A head traversing mechanism for a radial drill having an arm member and a tool carrying head member laterally movable therealong comprising a screw shaft element disposed lengthwise the drill arm, a cooperating nut element carried by the drill head; a manually operable hand wheel operatively connected with one of said screw and nut elements for actuating same to effect translation of the drill head along the arm at a feeding rate, and electively available means for positively limiting the feed movement to a definite distance.

LAWRENCE LEE SCHAUER.